(12) United States Patent
Hubbard

(10) Patent No.: US 8,109,674 B2
(45) Date of Patent: Feb. 7, 2012

(54) BEARING ASSEMBLY HAVING A DUAL STAGE SEAL

(75) Inventor: Paul A. Hubbard, Petersburg, VA (US)

(73) Assignee: Amsted Rail Company, Inc., Granite City, IL (US)

( * ) Notice: Subject to any disclaimer, the term of this patent is extended or adjusted under 35 U.S.C. 154(b) by 452 days.

(21) Appl. No.: 12/386,982

(22) Filed: Apr. 27, 2009

(65) Prior Publication Data

US 2010/0272381 A1    Oct. 28, 2010

(51) Int. Cl.
*F16C 33/72*    (2006.01)
(52) U.S. Cl. ........ 384/143; 384/480; 384/484; 384/144; 384/147
(58) Field of Classification Search .................. 384/480, 384/484, 140, 143, 144, 147, 607, 478
See application file for complete search history.

(56) References Cited

U.S. PATENT DOCUMENTS

| | | | | |
|---|---|---|---|---|
| 3,627,390 A | * | 12/1971 | Irwin | 384/478 |
| 3,741,614 A | * | 6/1973 | Judge | 384/459 |
| 4,438,900 A | * | 3/1984 | Schaeper et al. | 251/1.2 |
| 5,380,102 A | * | 1/1995 | Sink | 384/484 |
| 5,975,533 A | * | 11/1999 | Hubbard et al. | 277/351 |
| 7,607,836 B2 | * | 10/2009 | Mason et al. | 384/480 |

FOREIGN PATENT DOCUMENTS

| | | |
|---|---|---|
| JP | 09068232 | 3/1997 |
| WO | WO 99/48742 | 9/1999 |

* cited by examiner

*Primary Examiner* — Patrick Mackey
(74) *Attorney, Agent, or Firm* — Edward J. Brosius

(57) ABSTRACT

A bearing assembly is presented having a novel lubricant sealing design that, in one embodiment, combines the sealing advantages of both a labyrinth-like seal in combination with a contact seal. The improved seal includes a non-rotating seal case working in closely spaced cooperation with a rotor to form a channel. The rotor is attached and turns with the shaft, inducing flow in the channel. Lubricant leakage is impeded by the tortuous fluid path formed by the convoluted channel of the labyrinth-like seal and the fluid shear forces developed by the turning shaft. Any lubricant leakage is further impeded by a resilient seal contacting the surface of the rotor and constricting the channel.

11 Claims, 3 Drawing Sheets

BEARING ASSEMBLY HAVING A DUAL STAGE SEAL

CROSS REFERENCE TO RELATED APPLICATIONS

This application is related to U.S. patent application Ser. No. 11/724,696, filed on Mar. 16, 2007 and entitled, "Seal For Railway Car Journal Bearing", which is hereby incorporated by reference in its entirety.

FIELD OF THE INVENTION

This invention relates to anti-friction bearings and more particularly, in one embodiment, to tapered roller bearings.

BACKGROUND OF THE INVENTION

Anti-friction bearings (also commonly known as rolling-contact bearings), such as ball bearings and tapered roller bearings, are commonly used in various industrial applications. Anti-friction bearings are typically purchased preassembled, ready for press fit onto the journal of a shaft or axle.

A lubricant (e.g., oil or grease) is applied to the bearing's rollers to minimize friction and wear. The quantity and quality of the lubricant has a significant effect on bearing life. To maximize the life of the bearing, bearing seals are used to retain lubricant within the bearing and exclude environmental contaminants. A good seal design strives to protect the bearing lubricant while balancing the need to minimize friction losses resulting from the bearing seal.

Bearings used in the railway industry to support railway car axles are a particularly demanding application, requiring energy efficiency while concurrently providing protection against environmental contaminants (such as water, dirt, sand etc.). These bearings must also effectively seal the bearing to minimize lubricant loss.

SUMMARY OF THE INVENTION

A bearing assembly is presented having a novel dual stage seal design. The seal includes a seal case working in closely spaced cooperation with a rotor to establish two types of seals: (1) a running seal similar to a labyrinth type seal and (2) a contact or rubbing type seal.

In one embodiment, the seal case and rotor form a channel extending in a convoluted path from the lubricated interior portion of the bearing to the exterior of the bearing. The channel allows the rotating and non-rotating bearing assembly components to move relative to each other while minimizing lubricant loss.

The seal case is a non-rotating component, affixed to a non-rotating portion of the bearing assembly such as the bearing cup. The rotor is a rotating component, affixed and turning with the shaft. The rotor induces fluid shear in the lubricant disposed in the channel. The closely spaced and torturous path of the channel and the fluid shear imparted by the turning (i.e., rotating) rotor creates a labyrinth-like seal.

Any lubricant leakage in the channel that the labyrinth-like seal does not stop is further reduced with a contact type seal. The contact seal, in one embodiment, is a resilient seal affixed to the seal case and urged against the rotor.

The use of two different types of seals in one bearing assembly allows this novel seal design to incorporate certain attributes from each seal type. These two different seal types are incorporated into only two components of the bearing assembly: (1) the rotor, and (2) the seal case (with the attached seal).

The novel seal design eliminates the need for wear rings commonly found in many bearing applications. Wear rings protect shafts from rubbing wear induced by contact sealing elements. Forming a contact seal on the running surface of the rotor eliminates the need for a wear ring found in prior art bearing assemblies.

BRIEF DESCRIPTION OF THE FIGURES

Various embodiments of the bearing assembly are described and illustrated in the accompanying figures. The figures are provided as examples only and are not intended to be considered as limitations to the invention. Consequently, the bearing assembly is illustrated by way of example and not by limitation in the accompanying figures in which.

DETAILED DESCRIPTION

Figure 1:
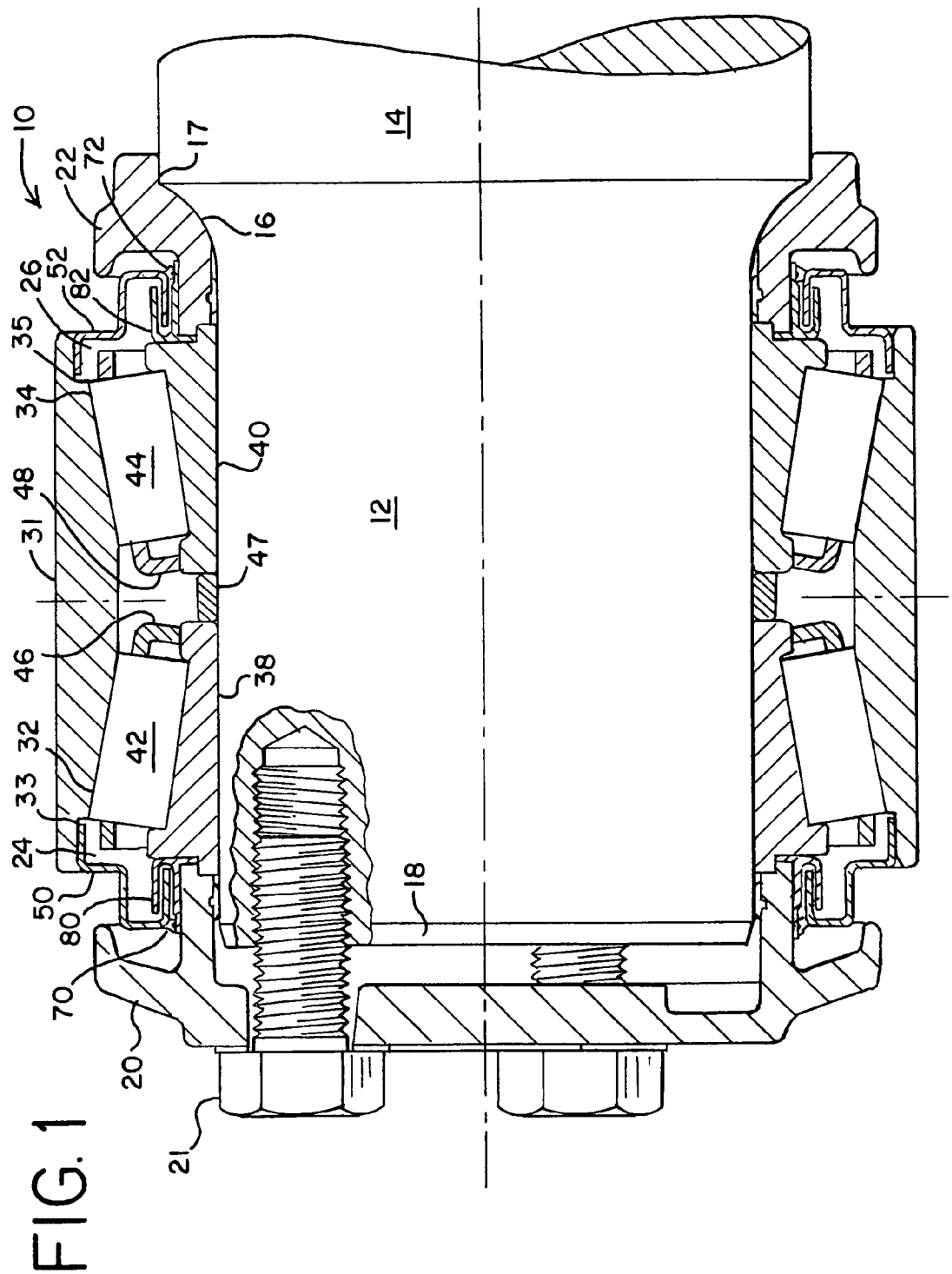
FIG. 1 is a sectional view of an exemplary embodiment of the bearing assembly.

Referring to FIG. 1, an exemplary bearing assembly 10 is illustrated. In this embodiment, the bearing assembly 10 is a tapered roller bearing assembly of the type commonly used in railway applications to support a low friction railcar wheel. The bearing assembly described in the following embodiments, however, may be adapted for use in many other common industrial applications. Consequently, the bearing assembly illustrated and described below in relation to a tapered roller bearing assembly for a railcar wheel is for convenience only. Furthermore, although the embodiments described and illustrated in the figures refer to tapered roller bearing assemblies, the novel bearing assembly described and claimed is generally applicable to anti-friction bearings.

The bearing assembly 10 is typically preassembled before being mounted on the journal 12 of a shaft 14 (e.g., a rail car axle). At the free end of the shaft 14, a journal 12 terminates in a slightly conical, tapered guide 18 to facilitate installation of the bearing assembly 10 onto the journal. The bearing assembly 10, in one embodiment, is press fit on the journal 12, which is machined to very close tolerances to accurately accommodate the press fit. The journal 12 terminates at its inner end in a contoured fillet 16 leading to a cylindrical shoulder 17 on the shaft 14. A backing ring 22 abuts the bearing assembly 10 and the shoulder 17, affixing the bearing assembly 10 against inward axial displacement. A bearing retaining cap 20, having a plurality of threaded bores 19, is mounted at the free end of the shaft 14 with threaded cap screws or bolts 21. The bearing retaining cap 20 clamps the bearing assembly 10 into position on the shaft 14.

In this embodiment, wear rings commonly used in the prior art to protect against shaft wear have been eliminated. Some prior art wear rings have been designed with polymer inserts to cushion and protect the shaft from wear ring induced fretting. For example, U.S. Pat. No. 5,549,395, "Shaft Journal Bearing Having Improved Seal Wear Ring," dated Aug. 27, 1996 to Sink discusses such a modified wear ring, and is hereby incorporated by reference in its entirety. Because there are no wear rings in this embodiment, the bearing retaining cap 20 and the backing ring 22, in one embodiment, have polymer inserts 27 that at least partially line their inner cylindrical surfaces. The inserts 27 may be affixed adhesively or fitted into keyways ground into the backing ring 22 or retaining cap 20. The polymer inserts 27 in the backing ring 22 and retaining cap 20 cushion flexural loads, mitigating journal 12 fretting and the potential failure of the shaft 14.

As indicated above, the bearing assembly 10 is preassembled from a number of individual components. The bearing assembly 10 includes a unitary bearing cup 31 having a pair of adjacent raceways 32, 34 formed on the inner surface of the bearing cup (one adjacent at each end of the bearing cup). The raceways 32, 34 cooperate with a pair of bearing cones 38, 40, respectively, to capture and support two rows of tapered rollers 42, 44. A center spacer 47 is positioned between the bearing cones 38, 40 to maintain the cones in accurately spaced position relative to one another and allow for proper bearing lateral clearance. In some embodiments, a cage 46, 48 controls the spacing of the rollers 42, 44 to maintain their relative position within the raceways 32, 34.

The seal cases 50, 52 substantially cover each end of the bearing assembly 10, protecting the bearing from external contaminants. The seal cases 50, 52, are a component of the dual stage seal system. The seal cases 50, 52, in one embodiment, are affixed to the stationary (i.e., non-rotating) side of the bearing assembly (such as the bearing cup 31) by interference fit or other appropriate method.

The rotors 80, 82 are another component of the dual stage seal system. In one embodiment, the rotors 80, 82 are affixed to the bearing cones 38, 40 and rotate with the shaft 14. In another embodiment, the rotors are captured between either a bearing retaining cap 20 or backing ring 22 and the bearing assembly 10. For example, the rotor 80 is affixed between bearing cone 38 and bearing retaining cap 20. At the other end of the bearing assembly 10, rotor 82 is affixed between the bearing cone 40 and backing ring 22.

The rotors 80, 82 and seal cases 50, 52 together are designed to control lubricant leakage and protect the bearing assembly 10 and lubricant 25 from intrusion of external contaminants. The seal case and rotor design are the same for both sides of the bearing assembly 10. The only difference is that one rotor is adjacent to the bearing retaining cap 20 and the other rotor to the backing ring 22.

The seal cases 50, 52 work in closely spaced cooperation with the rotors 80, 82 to control lubricant leakage. The lubricant 25 used in bearing assembly 10 may be, for example, either oil or grease. The lubricant 25 is in direct contact with the rollers 42, 44. Lubricant reservoirs 24, 26 may be provided at each end of the bearing assembly 10 to ensure adequate lubrication is supplied to the rollers 42, 44 and the surfaces contacting the rollers.

The closely spaced, cooperative relationship between the seal cases 50, 52 and the rotors 80, 82 form two types of seals: (1) a seal similar to a labyrinth type seal, and (2) a contact type seal. Each of these seal types has advantages and characteristics not offered by the other.

Figure 2:
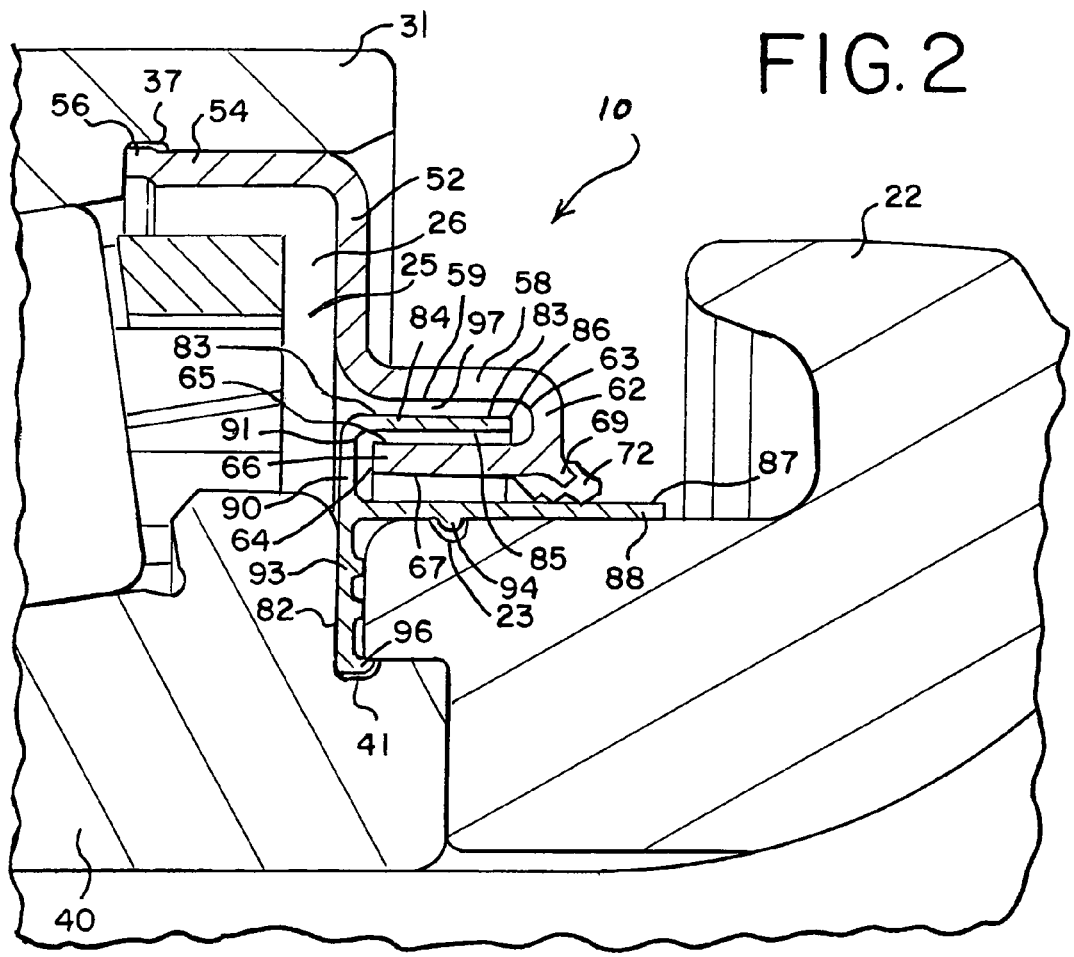
FIG. 2 is a detailed sectional view of a first embodiment of the sealing portion of the exemplary bearing assembly illustrated in FIG. 1.

Referring now to FIG. 2, a detailed view of one embodiment of the cooperative, closely spaced relationship between the seal case and rotor of the bearing assembly 10 of FIG. 1 is illustrated. The rotor 82 is a generally cylindrical piece having a rotor outer section 84 with the largest diameter. The rotor outer section 84 terminates in the rotor distal end section 86. The rotor intermediate circular section 90 extends from the rotor outer section 84 inward radially to the rotor inner section 88. The rotor root section 93 extends radially inward from the rotor intermediate circular section 90 past the rotor inner section 88.

In this embodiment, the rotor 82 is affixed to the backing ring 22. In turn, rotor 82 is affixed to the bearing cone 40. In the embodiment illustrated in FIG. 2, the backing ring 22 is locked in place by the rotor retaining lip 94 which is adapted to snap into the undercut retaining groove 23 in the backing ring 22. In turn, the rotor 82 is affixed to the bearing cone 40 with a second rotor retaining lip 96 similarly engaging an undercut retaining groove 41 in the bearing cone 40. The rotor root section 93 is captured between the bearing cone 40 and the backing ring 22, further acting to limit axial movement of the rotor 82. As the bearing cone 40 is affixed onto journal 12 (e.g., press fit), the backing ring 22, rotor 82, and bearing cone 40 are all locked together on and turn with the shaft 14.

The seal case 52 is closely spaced and works cooperatively with the rotor 82 to substantially seal the end of the bearing assembly 10. In one embodiment, the seal case 52 has a large diameter open end section 54 press fit into the counterbore 35 in the bearing cup 31. Alternatively, in another embodiment, the seal case 52 may have a retaining lip 56 adapted to snap into an undercut retaining groove 37 in the bearing cup 31. This design allows the seal case 52 to be releaseably retained on the bearing assembly 10.

A seal case intermediate section 58 has a smaller diameter cylindrical section running parallel to the open end section 54. A stator 66 of smaller diameter than the intermediate section 58 is a cylindrical section running parallel to the intermediate section 58. An inner circular section 62 extends between the intermediate section 58 and the stator 66. The seal case 52 terminates in a seal case distal end 64. A mounting ring 69 extends from the seal case 52 generally at the intersection of the inner circular section 62 and the stator 66.

The seal case and rotor combination function together to provide a dual stage lubrication seal. The seal case 52 works in closely spaced cooperation with rotor 82 to form a channel 97. The motion of the rotor 82 rotating with the shaft 14 relative to the non-rotating seal case 52 creates a rotating side of the channel 97 (i.e., the rotor side) and a stationary side of the channel (i.e., the seal case side). This relative motion induces shear stresses in the lubricant in the channel, impeding lubricant loss from the reservoir.

In one embodiment, the rotor and the seal case form a closely spaced, straight channel. In one embodiment, the channel may include chaplets (i.e., small surface projections acting similar to pump impellers) to help force lubricant from the channel toward the reservoir.

In another embodiment, the channel 97 is convoluted and forms a tortuous fluid flow path. The outer section 84, rotor distal end 86, and rotor inner section 88 of the rotor 82 form the rotor side of the channel 97. Closely spaced and cooperating with the rotor 82 is the seal case 52 which forms the seal case side of the channel 97 with seal case intermediate section 58, the seal case inner circular section 62, and the stator 66.

Consequently, in one embodiment, the channel 97 begins with the closely spaced outer surface 83 of the rotor outer section 84 and the inner surface 59 of the seal case intermediate section 58. The channel 97 continues around the rotor distal end 86 closely spaced to the circular surface 63 of the seal case inner circular section 62, reversing the direction of the channel. The channel 97 continues between the inner surface 85 of the rotor outer section 84 and the outer surface 65 of the seal case stator 66. The channel 97 continues around the seal case distal end 64 closely spaced to the rotor intermediate circular section 90, reversing the direction of the channel again. The channel 97 continues between the inner surface 67 of stator 66 and the outer surface 87 of the rotor inner section 88, exiting to the exterior of the bearing assembly 10 past the seal member (or seal) 72.

In one embodiment, the seal 72 is molded on and permanently bonded to mounting ring 69 projecting from the seal case 52. The seal 72 makes contact with rotor 82 to create a sealing surface to limit lubricant leakage.

Figure 3:
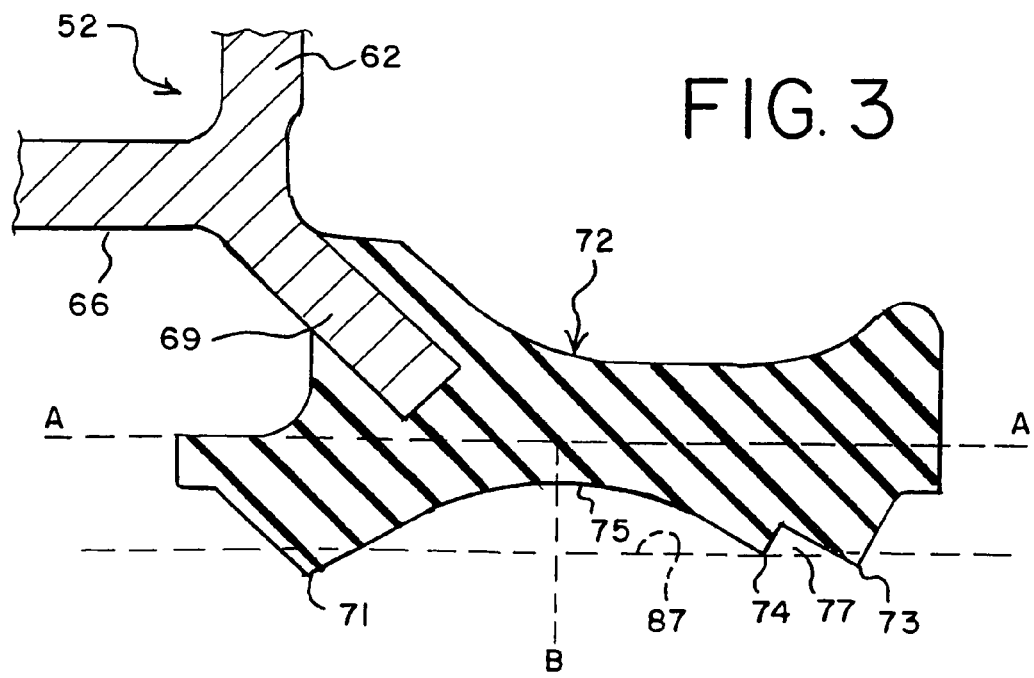
FIG. 3 is a detailed sectional view of the seal in the exemplary bearing assembly illustrated in FIG. 1.

Referring to FIG. 3, one embodiment of a seal 72 typically used in tapered bearing assemblies is illustrated. In this embodiment, the seal 72 is an integrally molded annular ring of elastomeric or rubber like material of suitable density and hardness selected for the particular application as is known in the art. For example, common materials of construction for the seal 72 include Nitrile Butadiene Rubber (NBR), Viton, silicone, etc. The seal 72, however, may be constructed of non-elastomeric materials (e.g., felt, thermoplastic and thermosetting polymers) or combinations of materials (e.g., a fabric reinforced elastomeric material).

Seals constructed from elastomeric materials are useful for providing a resilient seal. The resiliency of the seal urges the seal 72 against the surface of the rotor 82, exerting a substantially constant pressure to resist lubricant leakage.

To further increase the sealing force of the seal 72, a mechanical spring (not shown), such as an endless coil or garter spring may back the seal. These springs are designed to maintain a continuous, controlled sealing pressure between the seal and the rotor. This spring is optional, and may be omitted to enable a lighter contact or non-contacting seal to be formed. An example of such a spring assembly is described in U.S. Pat. No. 5,186,548, entitled "Bearing Shaft Seal," granted Feb. 16, 1993, to Sink which is hereby incorporated by reference in its entirety.

The seal 72 may be designed in any number of different embodiments. For example, the seal may be a simple felt type seal. Alternatively, the seal 72 may be technically sophisticated. For example, in one embodiment, the seal may have a separate lubricant seal lip 71 and primary dust seal lip 73. The lubricant seal lip 71 provides the primary lubricant sealing area against the rotor 82.

Various design variations may be incorporated into the lubricant seal lip 71. These include projections from the lubricant seal lip 71 that act as a pump to counter lubricant leakage. These seal designs are discussed in detail in U.S. Pat. No. 5,511,886, entitled "Bearing Seal With Oil Deflectors," granted Apr. 30, 1996, to Sink which is hereby incorporated by reference in its entirety.

At its outer end, the seal 72 is provided with a primary dust seal lip 73 to exclude contaminants. In one embodiment, the seal 72 may have a pair of dust seal lips. In this embodiment, the seal 72 includes an outwardly directed primary dust seal lip 73 and an auxiliary, inwardly spaced; outwardly directed secondary dust seal lip 74. The primary dust seal lip 73 and the secondary dust seal lip 74 are generally located axially outward from the bearing assembly.

The seal 72 has a concave inner surface 75 between lubrication seal lip 71 and secondary dust lip 74 which, together with the outer surface 87 of the rotor 82 defines a first annular chamber 76 when the seal 72 is installed. This first annular chamber 76 may be packed with a suitable lubricant prior to installing the seal case 52.

Similarly, a second annular chamber 77 is provided between the adjacent surfaces of the primary dust seal lip 73 and the secondary dust seal lip 74 and the outer surface 87 of rotor 82. This second annular chamber 77 may also be packed with lubricant prior to installation on the shaft 14.

Figure 4:
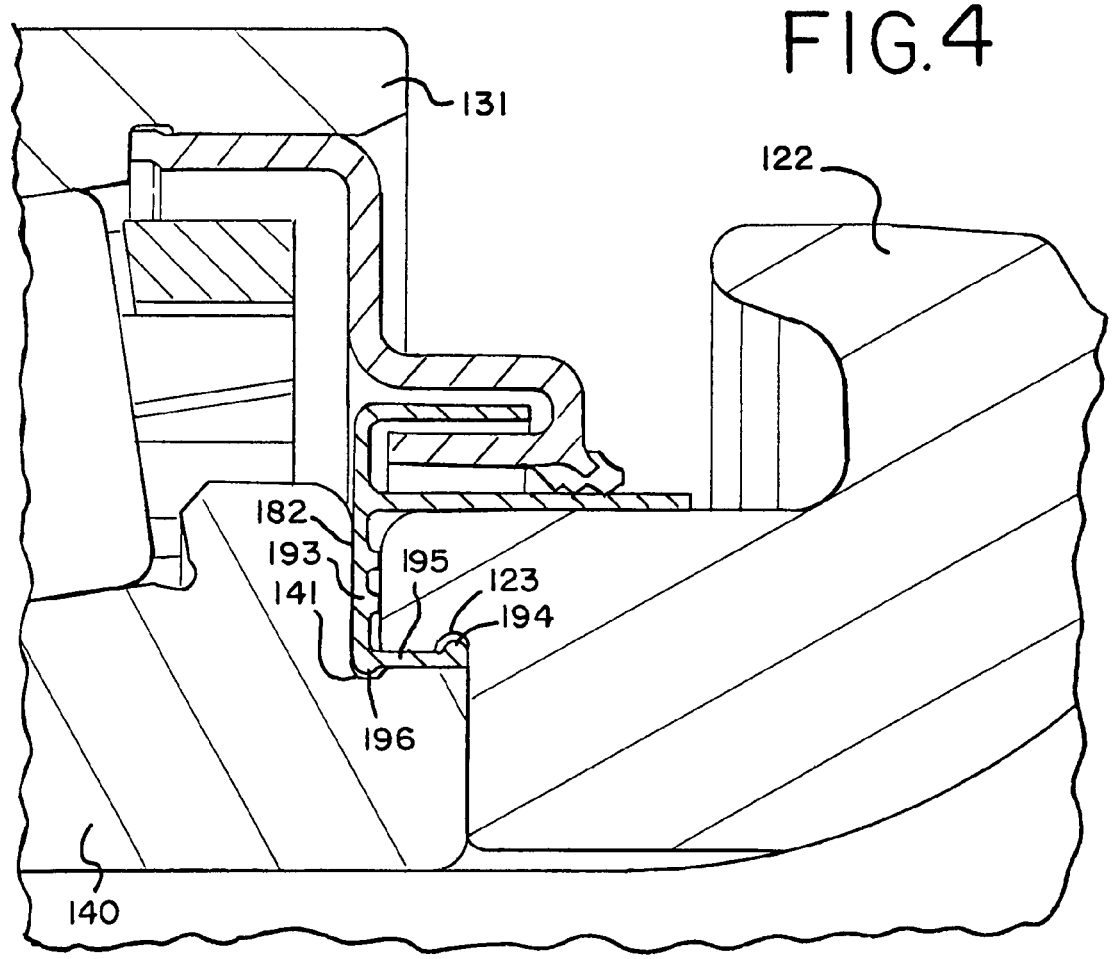
FIG. 4 is a detailed sectional view of a second embodiment of the sealing portion of the exemplary bearing assembly illustrated in FIG. 1.

Referring now to FIG. 4, a detailed view of bearing assembly 110 having an alternative embodiment of the seal case and rotor sealing arrangement is illustrated. The only difference between the bearing assemblies depicted in FIG. 2 and FIG. 4 is the attachment of the modified rotor 182 to the backing ring 122 and the bearing cone 140.

The rotor 182 has a return section 195 extending normally from the rotor root section 193. This return section 195 is accommodated between an annular space formed between the bearing cone 140 and the backing ring 122. The rotor return section 195 has a first retaining lip 194 that fits into the retaining groove 123 in backing ring 122.

Similar to the rotor 82 depicted in FIG. 2, the rotor 182 also has a second retaining lip 196 on the rotor root section 193 that fits into an undercut retaining groove 141 in the bearing cone 140. Consequently, the two retaining lips 194, 196 on the rotor 182 respectively connect with the bearing ring 122 and the backing cone 140 to connect these components together as one rotating assembly on the shaft 14.

Although the discussion above relating to FIG. 2 and FIG. 4 details the design and operation of the rotor and seal case adjacent to the backing ring, the design and operation of the rotor and seal case adjacent to the bearing retaining cap is identical. Instead of the rotor connecting to the backing ring, the rotor connects to the bearing retaining cap.

While the invention has been illustrated with respect to several specific embodiments, these embodiments are illustrative rather than limiting. Various modifications and additions could be made to each of these embodiments as will be apparent to those skilled in the art. Accordingly, the invention should not be limited by the above description or of the specific embodiments provided as examples. Rather, the invention should be defined only by the following claims.

The invention claimed is:

1. A bearing assembly, comprising:
   a bearing cone;
   a bearing cup having an inner surface, the inner surface having a raceway;
   a plurality of rollers captured between the raceway and the bearing cone;
   a rotor affixed to the bearing cone;
   a seal case affixed to the bearing cup, the seal case in closely spaced cooperation with the rotor to form a channel; and
   a seal affixed to the seal case, the seal extending to contact the rotor to constrict the channel, further comprising a bearing retaining cap affixed to the rotor.

2. The bearing assembly of claim 1, wherein the seal is an elastomeric seal.

3. The bearing assembly of claim 1, wherein the seal comprises:
   a dust sealing lip; and
   a lubrication sealing lip;
   wherein the dust sealing lip and the lubrication sealing lip contact the rotor.

4. The bearing assembly of claim 1, further comprising a backing ring affixed to the rotor.

5. The bearing assembly of claim 1, wherein the channel is convoluted.

6. The bearing assembly of claim 1, further comprising a cage to separate the plurality of rollers.

7. A bearing assembly for attachment to a shaft, comprising:
   a bearing cup having a raceway;
   a bearing cone affixed to the shaft;
   a plurality of rollers captured between the raceway and the bearing cone;
   a rotor turning with the shaft;

a seal case affixed to the bearing cup, the seal case in closely spaced cooperation with the rotor to form a channel; and a seal affixed to the seal case, the seal contacting the rotor to constrict the channel, further comprising a bearing retaining cap, wherein the bearing retaining cap is affixed to the rotor.

8. The bearing assembly of claim 7, further comprising a backing ring, wherein the backing ring is affixed to the rotor.

9. The bearing assembly of claim 7, wherein the rotor is affixed to the bearing cone.

10. The bearing assembly of claim 7, wherein the channel is convoluted.

11. The bearing assembly of claim 7, further comprising a cage for separating the plurality of rollers.

* * * * *